United States Patent
Birmelin

(10) Patent No.: US 10,851,529 B2
(45) Date of Patent: Dec. 1, 2020

(54) SANITARY OUTLET DEVICE

(71) Applicant: Neoperl GmbH, Mullheim (DE)

(72) Inventor: David Birmelin, Mullheim (DE)

(73) Assignee: Neoperl GmbH, Mülheim (DE)

( * ) Notice: Subject to any disclaimer, the term of this patent is extended or adjusted under 35 U.S.C. 154(b) by 52 days.

(21) Appl. No.: 16/327,064

(22) PCT Filed: Sep. 7, 2017

(86) PCT No.: PCT/EP2017/001063
§ 371 (c)(1),
(2) Date: Feb. 21, 2019

(87) PCT Pub. No.: WO2018/050274
PCT Pub. Date: Mar. 22, 2018

(65) Prior Publication Data
US 2019/0203451 A1    Jul. 4, 2019

(30) Foreign Application Priority Data

Sep. 15, 2016 (DE) .................. 20 2016 005 646 U

(51) Int. Cl.
*E03C 1/08* (2006.01)
*F16L 15/00* (2006.01)
(52) U.S. Cl.
CPC .............. *E03C 1/08* (2013.01); *F16L 15/009* (2013.01)
(58) Field of Classification Search
CPC .. E03C 1/08; E03C 1/084; E03C 1/086; F16L 15/008; F16L 15/009

USPC ....................................................... 239/428.5
See application file for complete search history.

(56) References Cited

U.S. PATENT DOCUMENTS

| 2,746,486 A | 5/1956 | Gratzmuller | |
|---|---|---|---|
| 2,787,452 A | 4/1957 | Aghnides | |
| 3,298,614 A | 1/1967 | Aghnides | |
| 3,348,777 A * | 10/1967 | Hjulian | E03C 1/084 239/424.5 |
| 3,672,574 A | 6/1972 | Knapp | |
| 3,827,636 A | 8/1974 | Parkison et al. | |
| 3,851,825 A * | 12/1974 | Parkison | E03C 1/086 239/590.3 |
| 4,313,564 A | 2/1982 | Shames et al. | |
| 4,534,513 A | 8/1985 | Aghnides | |
| 7,552,879 B2 * | 6/2009 | Nagata | E03C 1/08 239/428.5 |
| 7,644,876 B2 | 1/2010 | Weis et al. | |

(Continued)

FOREIGN PATENT DOCUMENTS

DE   102010023665   12/2011
EP   2025820   2/2009

*Primary Examiner* — Darren W Gorman
(74) *Attorney, Agent, or Firm* — Volpe Koenig

(57) ABSTRACT

A sanitary outlet device (1, 2) including a housing (3) which has a fitting receptacle (6) with a thread (7) at an inflow end of a flow path (11). A mating thread (8) of a fitting outlet (12) can be screwed together with the thread (7). An outflow-side end of the thread (7) is equipped with a seal (9) by which the flow path (11) of the water flowing through a flow channel of the sanitary outlet device (1, 2) can be sealed outwards at a transition between a screwed-in fixture outlet (12) and the housing (3). The seal (9) forms an inner surface (10), which can be wetted by water flowing in the flow path (11) and which is free of rubber, at the transition.

14 Claims, 6 Drawing Sheets

(56) References Cited

U.S. PATENT DOCUMENTS

| | | | | |
|---|---|---|---|---|
| 8,708,252 | B2* | 4/2014 | Blum | B05B 1/3402 |
| | | | | 239/428.5 |
| 8,919,680 | B2* | 12/2014 | Grether | E03C 1/084 |
| | | | | 239/600 |
| 9,464,419 | B2* | 10/2016 | Blum | E03C 1/086 |
| 2009/0242819 | A1* | 10/2009 | Gao | E03C 1/04 |
| | | | | 251/323 |
| 2013/0082121 | A1* | 4/2013 | Stein | E03C 1/08 |
| | | | | 239/428.5 |
| 2013/0221132 | A1* | 8/2013 | Egli | B05B 1/3431 |
| | | | | 239/490 |

\* cited by examiner

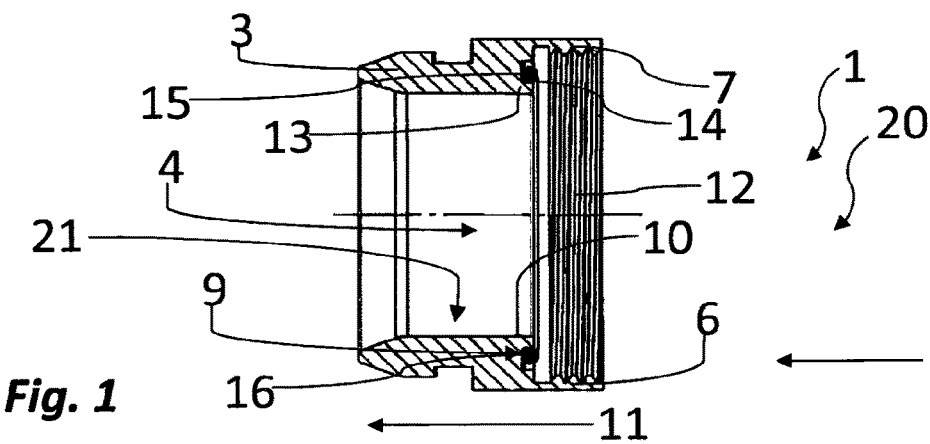
*Fig. 1*
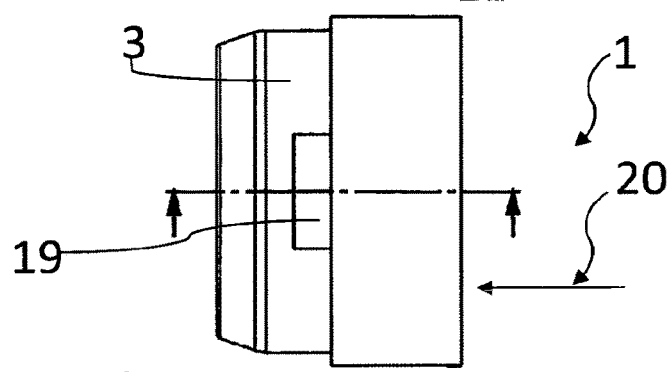
*Fig. 2*
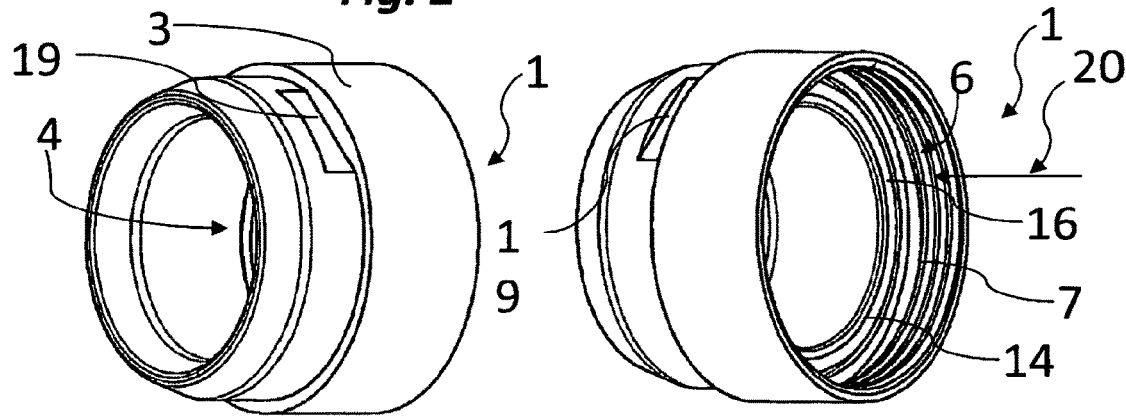
*Fig. 3*          *Fig. 4*
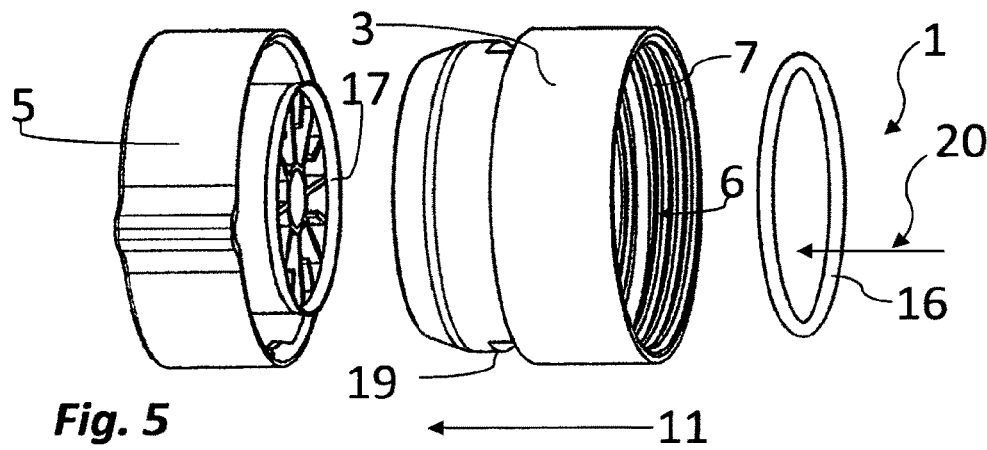
*Fig. 5*

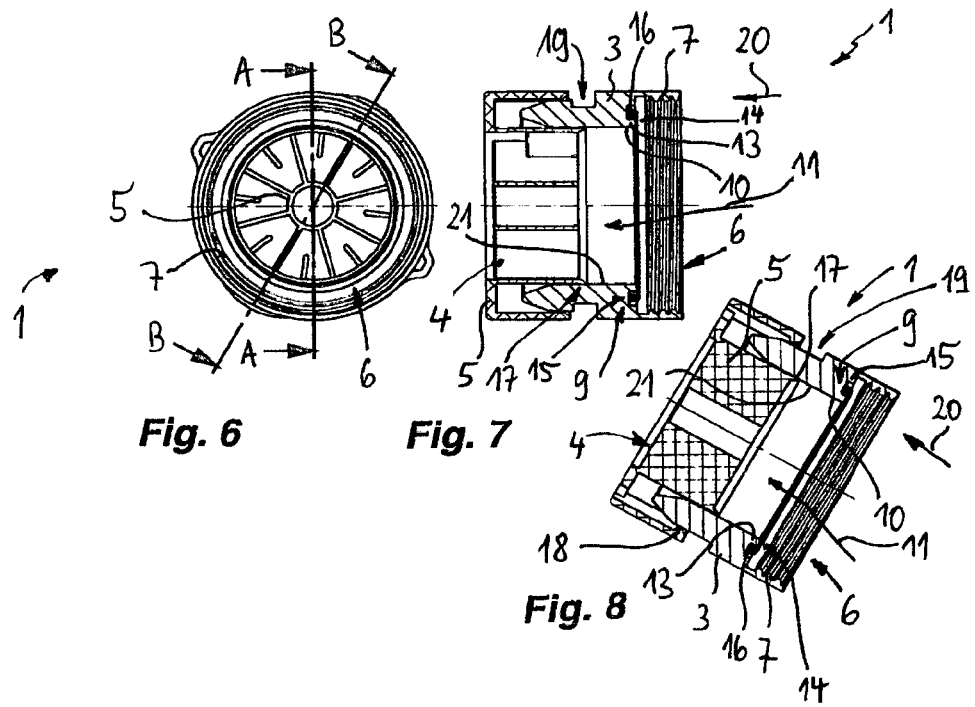
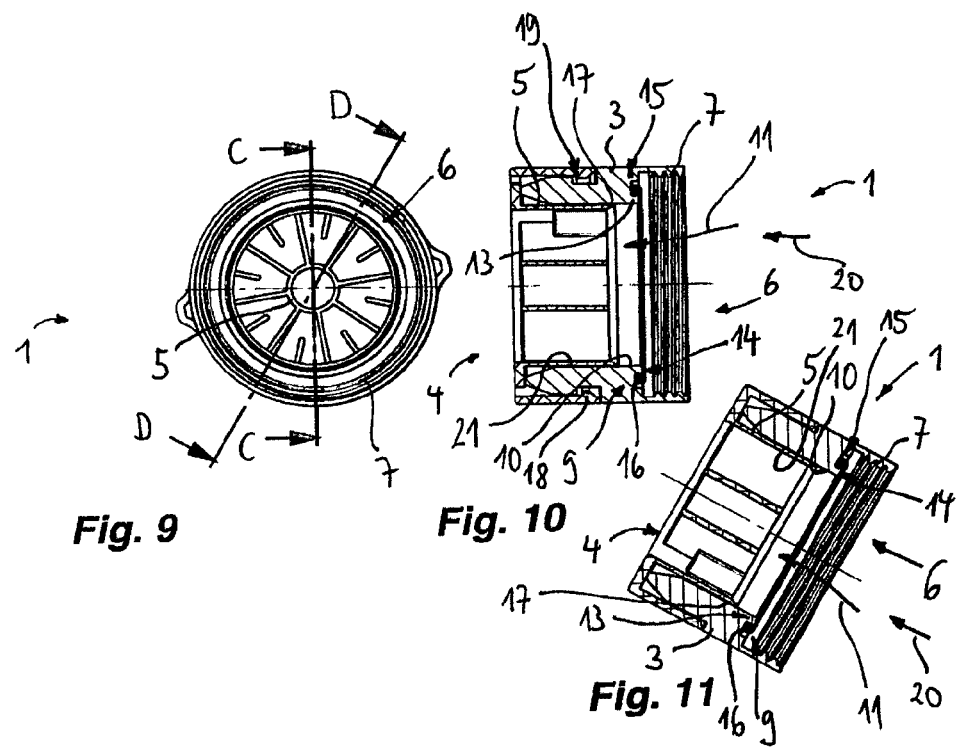

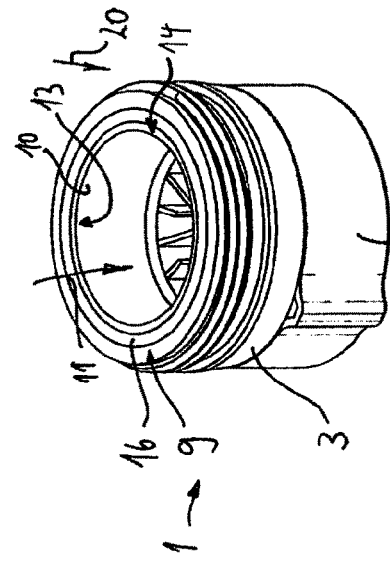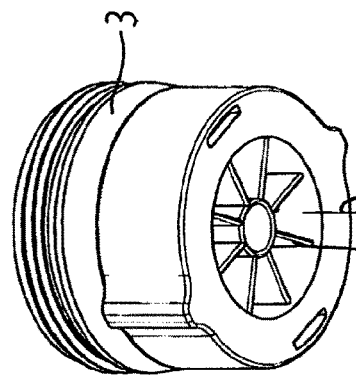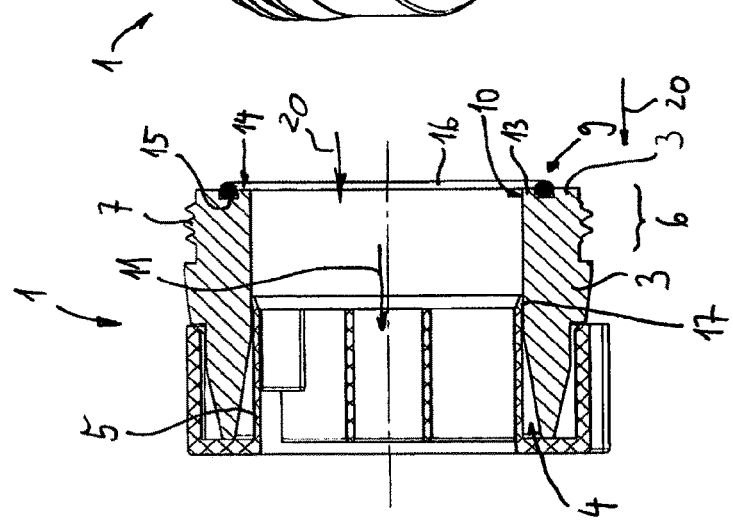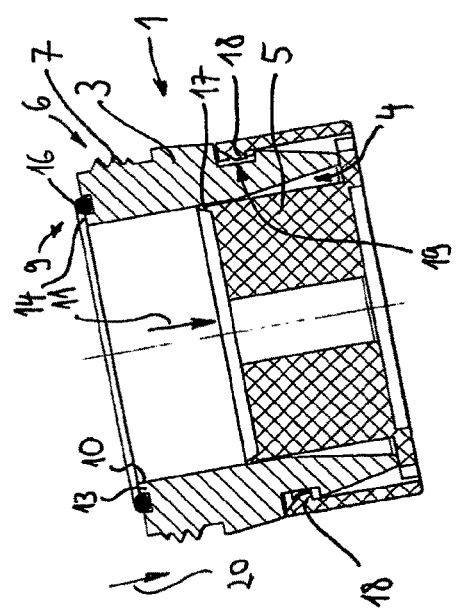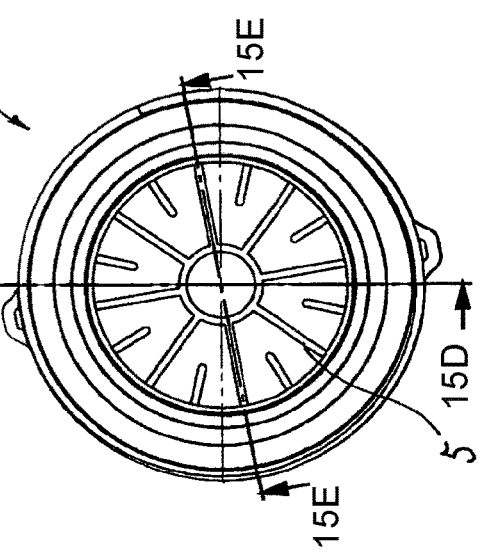
Fig. 15A
Fig. 15B
Fig. 15C
Fig. 15D
Fig. 15E

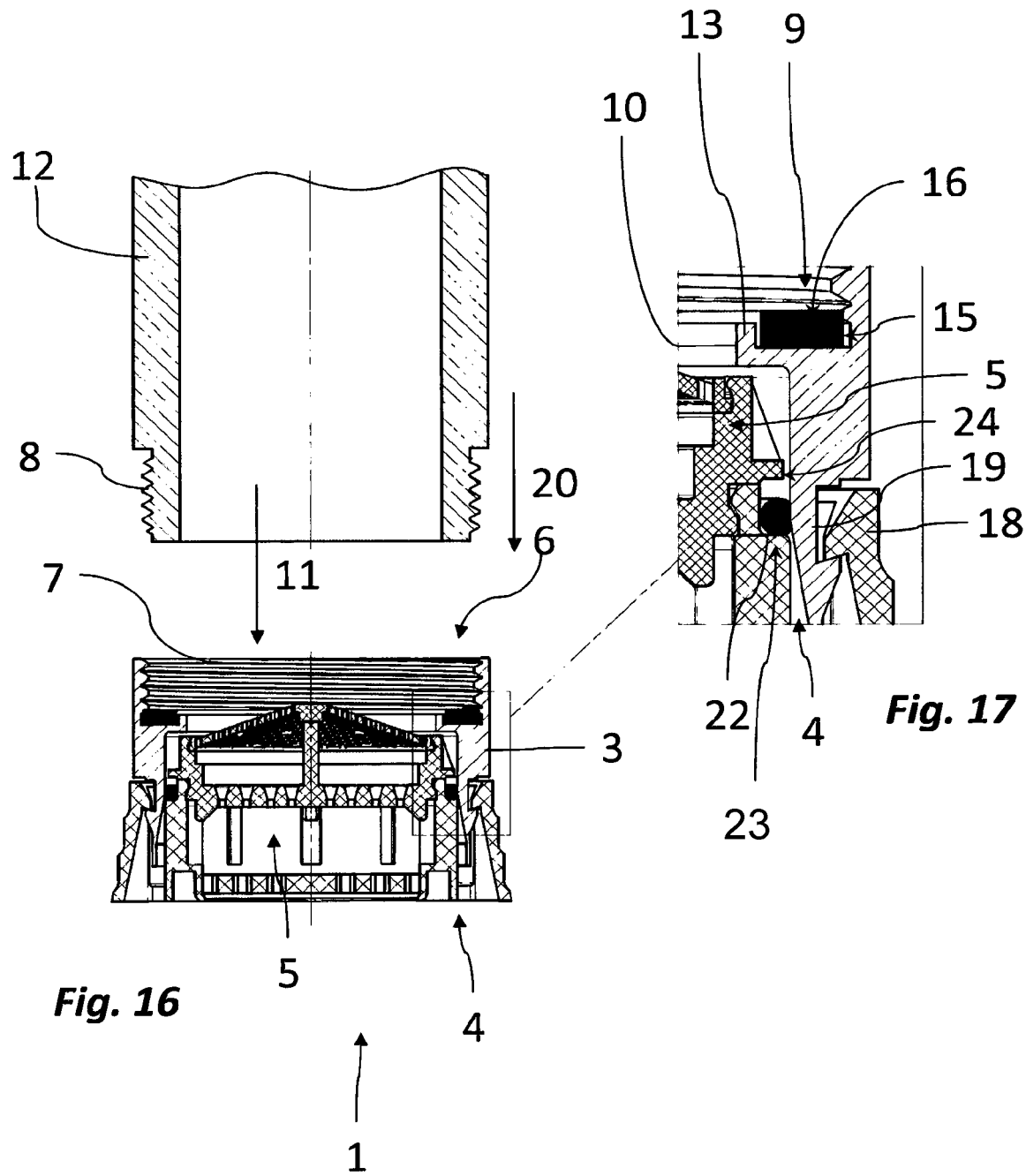

SANITARY OUTLET DEVICE

BACKGROUND

The invention relates to a sanitary outlet device having a housing which has, at an inflow end of a flow path, a fitting receptacle having a thread, wherein a counterpart thread of a fitting outlet is able to be screwed together with the thread, wherein, at an outflow-side end of the thread, a seal is formed with which the flow path is able to be sealed off from the outside at a transition from a screwed-in fitting outlet to the housing, wherein the seal forms, at the transition, an inner face that is wettable by flowing water in the flow path. Outlet devices of this kind are known and are screwed together with a fitting outlet in order to provide a desired functionality in the flow path. This can be for example jet formation or flow regulation. Here, it has become conventional to seal off the outlet device with respect to the fitting outlet. In this way, it is possible to prevent water from escaping from the flow path when a backpressure is formed as a result of the desired functionality. This sealing has thus far been effected by a rubber ring which is placed on a flange in the fitting receptacle.

EP 2 025 820 A2 relates to a sanitary functional unit which is insertable as an insert cartridge into a liquid guide of a sanitary outlet fitting and has a housing, a jet regulator and an inflow-side dome screen, wherein the housing bears an external thread on the outside, which is able to be screwed into an internal thread of the outlet fitting, wherein an annular seal is arranged on the outflow side next to the external thread, wherein the length of the housing is dimensioned substantially for the arrangement of the external thread and adjoining annular seal, and wherein a jet splitter part is that is connectable to the housing is arranged on the inflow side.

DE 10 2010 023 665 A1 relates to a jet regulator having a jet regulator housing which has a housing part with a sleevelike housing wall, said housing part being connected in one piece, in its sleeve interior, to a jet splitter oriented transversely to the flow-through direction, said jet splitter having a plurality of flow-through openings for splitting in the inflowing water flow into a plurality of individual jets, wherein an external thread is provided on the outer circumference of that portion of the housing wall that adjoins the inflow-side section of the sleeve interior.

SUMMARY

The invention is based on the object of creating a sanitary outlet device having improved use properties.

In order to achieve the abovementioned object, one or more features according to the invention are used. Thus, in particular, in order to achieve the abovementioned object in a sanitary outlet device of the type described at the beginning, the invention proposes that the inner face be formed in a rubber-free manner. Of advantage here is that contact between rubber and water which flows in the flow path is avoidable. Since rubber tends to be colonized with microorganisms, a product is able to be provided in this way that remains free of microorganisms for a greater length of time or at least is colonized with microorganisms only to a minor extent. This considerably improves the use properties.

In an advantageous configuration, provision may be made for the seal to have a protrusion that extends in an encircling manner in the fitting receptacle and forms the rubber-free inner face on a side facing the flow path. In this way, the rubber-free inner face is able to be formed by a rubber-free material of the protrusion and in particular of the housing. Preferably, the protrusion is integrally formed on the housing, for example connected thereto in one piece.

Preferably, the protrusion protrudes into the fitting receptacle counter to a screwing direction, defined by the thread, on the housing. As a result, this makes it possible, in a structurally simple manner, for the protrusion to terminate at the fitting outlet. The screwing direction can in this case be characterized for example as that direction with that sense of direction in which, respectively, the fitting outlet approaches the outlet device during screwing.

It is particularly preferred for the protrusion to be integrally formed on the housing. In this way, a number of parts and assembly effort are reducible. For example, provision may be made for the protrusion to be connected to the housing in one piece. This is easily produced as an injection-molded part, for example made of plastic, or as a turned part, for example made of metal.

In an advantageous configuration, provision may be made for a protrusion that extends in an encircling manner in the fitting receptacle, for example the abovementioned protrusion, to be formed radially within the thread. In this way, the sealing between the housing and the fitting outlet is able to be formed within the thread. In this case, the protrusion can be arranged in a manner axially offset with respect to the thread, but on a smaller radius than the latter. In this case, the protrusion can also be formed axially at the same level as the thread, for example when the thread is a counterpart thread and/or when the protrusion projects internally into the thread.

Alternatively or additionally, the protrusion can be formed radially at a distance from the thread. In this way, a space for receiving the fitting outlet is created.

In an advantageous configuration, provision may be made for the protrusion to be made of a deformable material. In this way, it is possible to dispense with additional sealants. A tight connection is easily achievable even in the case of uneven fitting outlets.

Preferably, the protrusion is made of preferably thermoplastic, particularly preferably high-molecular weight thermoplastic material. In this way, an easily deformable and/or favorably producible protrusion is described. A protrusion made of plastic is in particular easy to form integrally on a housing made of the same plastic. Particularly suitable here is POM (polyoxymethylene, also known as polyacetal, polyformaldehyde or acetal). Here, POM can be characterized as a high-molecular weight thermoplastic material.

In an advantageous configuration, provision may be made for the protrusion to have a cross-sectional profile that narrows counter to a screwing direction defined by the thread. This makes it possible for the protrusion to taper to a point in cross section toward its free end. The protrusion is therefore easily deformable at its free end, which can represent a stop for a screwed-in fitting outlet. In this way, it is possible for the (deformed) protrusion to bear tightly on the fitting outlet. It is thus possible to dispense with sealing rings made of rubber.

In an advantageous configuration, provision may be made for the encircling protrusion to have a contact face that is oriented counter to the screwing direction and forms a stop for a screwed-in fitting outlet. In this way, sealing of a transition between the protrusion and a screwed-in fitting outlet is able to be created. Thus, extensive bearing on the fitting outlet is achievable. This is particularly advantageous for the variant having a sealing ring, since in this way access of flowing water to the sealing ring located downstream of the protrusion from the point of view of the water is made more difficult or prevented.

In an advantageous configuration, provision may be made for the thread to allow a fitting outlet to be screwed beyond an inflow-side end of the protrusion. This creates a clearance in order for it to be possible to press the fitting outlet firmly onto the protrusion. This improves the sealing of the flow path at this point.

In an advantageous configuration, provision may be made for the protrusion to form a stop for any screwing, in particular the abovementioned screwing, of a fitting outlet. In this way, the screwed-in fitting outlet can be placed extensively and tightly on the protrusion.

In an advantageous configuration, provision may be made for the protrusion to delimit a groove, extending in an encircling manner in the fitting receptacle, with respect to the flow path. In this way, a sealing ring, for example a rubber ring, is introducible. This rubber ring is able to be recessed in the groove in order to exclude contact with water in the flow path as far as possible.

In this case, provision may be made for the groove to be open counter to a screwing direction defined by the thread. In this way, the rubber ring is introducible through the fitting receptacle.

In an advantageous configuration, provision may be made for a rubber ring to have been introduced into the encircling groove. As a result of the rubber ring, additional sealing with respect to any leakage of water due to a high backpressure is able to be formed. Additional sealing by the protrusion and the screwed-in fitting outlet can help to impede or prevent any backflow of contaminated water into the flow path.

In an advantageous configuration, provision may be made for the rubber ring to protrude from the groove, in an unloaded state, counter to the screwing direction. The rubber ring is thus deformable by the screwed-in fitting outlet, in order to achieve particularly good sealing.

Alternatively or additionally, provision may be made for the groove to be formed less deeply than is necessary to fully receive the rubber ring. Axial impingement of an introduced rubber ring is thus easily achievable by the fitting outlet.

In an advantageous configuration, provision may be made for the groove to be dimensioned such that the rubber ring is receivable without sticking out in a compressed state. Thus it is possible to avoid a situation in which the rubber ring prevents the fitting outlet from bearing directly on the protrusion.

In an advantageous configuration, provision may be made for the rubber ring to have a nonround or round cross-sectional profile. The nonround profile can be formed for example in a rectangular or triangular manner, without or with a sealing lip, for example as a quad profile (double-acting four-lip seal), or in some other way. A rectangular cross-sectional profile has the advantage of being cost-effective to produce from bar material. In addition, in the case of a rectangular profile, extensive bearing on the fitting outlet is achievable. Sealing lips or quad profiles achieve particularly good sealing. A round cross-sectional profile is achievable for example by an O-ring.

In an advantageous configuration, provision may be made for a volume of the groove to be greater than a volume of the rubber ring. In this way, space is able to be provided by the volume delimited or enclosed by the groove, the introduced rubber ring being able to be pressed into said space in the impinged state without the for example substantially incompressible rubber ring protruding beyond an edge of the groove. Direct contact with flowing water can thus be avoided.

In an advantageous configuration, provision may be made for the housing to be made of metal at least at the fitting receptacle. In this way, a mechanically stable housing is able to be formed. Preferably, the protrusion is likewise made from metal in this case, for example in a common processing operation with the rest of the housing.

A preferred application of the invention arises when the sanitary outlet device is a hygiene jet former or hygiene jet regulator. Bacterial contamination in the flow path is avoidable by the rubber-free configuration, according to the invention, of a boundary of the flow path.

In an advantageous configuration, provision may be made for the housing to transition, on the outflow side with respect to the rubber-free inner face, into a widening jet former receptacle, into which a jet former is inserted in a removable manner. Of advantage here is the fact that an interchangeable functionality is able to be provided in the flow path.

In this case, provision may be made for the jet former to be inserted counter to a direction of flow of the flow path. As a result, the jet former is easily removable without the housing having to be removed from the fitting outlet.

Alternatively or additionally, provision may be made for the jet former to be inserted so as to be removable counter to the screwing direction defined by the thread. As a result, the jet former is easily arranged in an extension of the fitting outlet.

In an advantageous configuration, provision may be made for the jet former to be deformed, in the inserted state, at least at its inflow-side end, by the jet former receptacle. In this way, a tight termination between the jet former receptacle and the jet former is achievable. Any escape of water from the flow path next to the jet former is thus avoidable.

In an advantageous configuration, provision may be made for the jet former to have, at its inflow-side end, a sealing lip that bears on the jet former receptacle. In this way, sealing is improvable even further at this point. The jet former can thus be configured as a considerable flow obstacle with a large flow resistance, without the outlet device not being watertight laterally.

In an advantageous configuration, provision may be made for the jet former to be made of plastic. In this way, a cost-effective jet former with a complex surface and/or inner structure is able to be created.

As an alternative or in addition to the sealing lip, provision may be made for the jet former to have a sealing ring that bears on the jet former receptacle. In this way, a seal that is easy to produce and readily mountable is producible between the jet former and the housing. In this case, the sealing ring can be held axially, preferably via a shoulder or at least one radially protruding protrusion, on one side (for insertion into or extraction from the jet former receptacle with the jet former) or, preferably via two shoulders directed toward one another or at least two radially protruding protrusions that are axially spaced apart from one another and/or receive the sealing ring between one another, on both sides, for insertion into and extraction from the jet former receptacle with the jet former. Of advantage here is that the sealing ring is exchanged with the jet former. The sealing ring thus has to meet lower hygiene requirements than the above-described seal. For example, the sealing ring can be produced from rubber even when it comes into contact with water in use.

It is particularly favorable when a sealing lip integrally formed on the jet former, for example as described above, is mounted upstream of the sealing ring. In this way, the advantages of a sealing lip, namely in particular the hygienic harmlessness, are combinable with the advantages of a sealing ring, namely in particular the increased tightness.

The invention thus relates to a sanitary outlet device having a housing which has, at an inflow end of a flow path, a fitting receptacle having a thread, wherein a counterpart thread of a fitting outlet is able to be screwed together with the thread. This screwing together can be for example screwing in or screwing on. At an outflow-side end of the thread, a seal is formed, with which the flow path of the water flowing through a flow duct of the sanitary outlet device is able to be sealed off from the outside at a transition from a screwed-in fitting outlet to the housing. The seal forms, at the transition, an inner face that is wettable by flowing water in the flow path and is formed in a rubber-free manner.

BRIEF DESCRIPTION OF THE DRAWINGS

The invention will now be described in more detail with reference to exemplary embodiments, but is not limited to these exemplary embodiments. Further exemplary embodiments arise by combining the features of individual or several patent claims with one another and/or with individual or several features of the exemplary embodiments.

In the figures:

FIG. 1 shows a specific embodiment, illustrated in a view in longitudinal section, of a sanitary outlet device according to the invention, which has been screwed together with a fitting outlet, FIG. 2 shows the sanitary outlet device from FIG. 1 in a side view, FIG. 3 shows the sanitary outlet device from FIGS. 1 and 2 in a perspective view, wherein an outflow-side end of the sanitary outlet device has been rotated toward the observer, FIG. 4 shows the sanitary outlet device from FIGS. 1 to 3 in a perspective view, wherein an inflow-side end of the sanitary outlet device has been rotated toward the observer, FIG. 5 shows an exploded illustration of a sanitary outlet device according to the invention with a jet former, FIG. 6 shows an embodiment of a sanitary outlet device with a jet former in a disassembly position, wherein the sanitary outlet device is mountable on a counterpart thread of a fitting outlet, and wherein the observer is looking onto the sanitary outlet device from above in the direction of flow, FIG. 7 shows the sanitary outlet device from FIG. 6 in the disassembly position illustrated as a longitudinal section, wherein the section is indicated through the vertical, dashed line A-A in FIG. 6, FIG. 8 shows the sanitary outlet device from FIGS. 6 and 7 illustrated as a longitudinal section, wherein the section is indicated by the inclined, dashed line B-B in FIG. 6, FIG. 9 shows the sanitary outlet device from FIGS. 6 to 8 in the assembly position, wherein the sanitary outlet device is mounted on a counterpart thread of a fitting outlet, and wherein the observer is looking onto the sanitary outlet device from above in the direction of flow, FIG. 10 shows the sanitary outlet device from FIG. 9 in the assembly position illustrated as a longitudinal section, wherein the section is indicated by the vertical dashed line C-C in FIG. 9, and wherein the jet former has been latched in place in a recess, provided for this purpose, in the outer circumference of the housing via two detents, FIG. 11 shows the sanitary outlet device from FIGS. 9 and 10 in the assembly position illustrated as a longitudinal section, wherein the section is indicated by the inclined dashed line D-D in FIG. 9, FIGS. 15A-15E show the outlet device according to FIG. 14 with a jet former in different views (in the clockwise direction from top right: FIG. 15A a three-dimensional oblique view of the inflow side, FIG. 15B a three-dimensional oblique view of the outflow side, FIG. 15D a sectional view along 15D-15D in FIG. 15C, FIG. 15C a view from below of the outflow side, and FIG. 15E a sectional view along line 15E-15E in FIG. 15C), FIG. 16 shows a further sanitary outlet device according to the invention in the position removed from the fitting outlet, and FIG. 17 shows an enlarged detail from FIG. 16.

DETAILED DESCRIPTION

FIGS. 1 to 11 illustrate various views of a sanitary outlet device which is denoted 1 overall. Here, FIGS. 1 to 4 show the outlet device 1 without a jet former 5 inserted.

Figure 12:
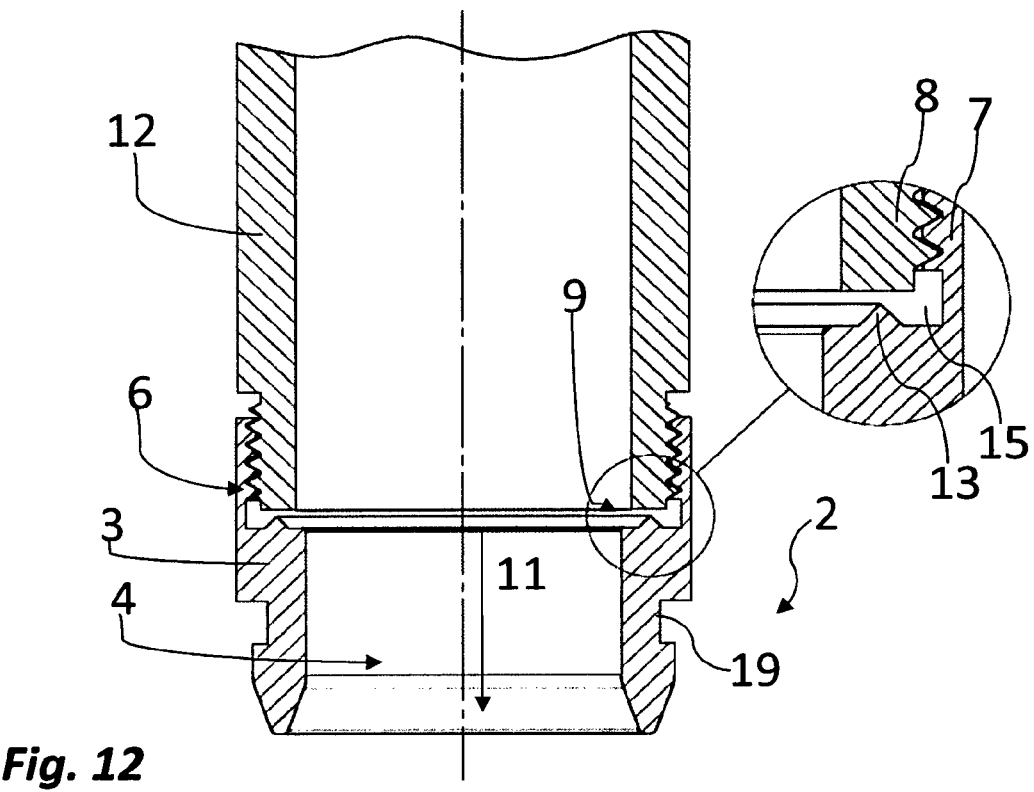
FIG. 12 shows a further specific embodiment of a sanitary outlet device according to the invention illustrated as a longitudinal section, wherein a counterpart thread of a fitting outlet has been partially screwed into a thread of a fitting receptacle, wherein a protrusion formed on a housing has a cross-sectional profile that narrows counter to a screwing direction defined by the thread.
Figure 13:
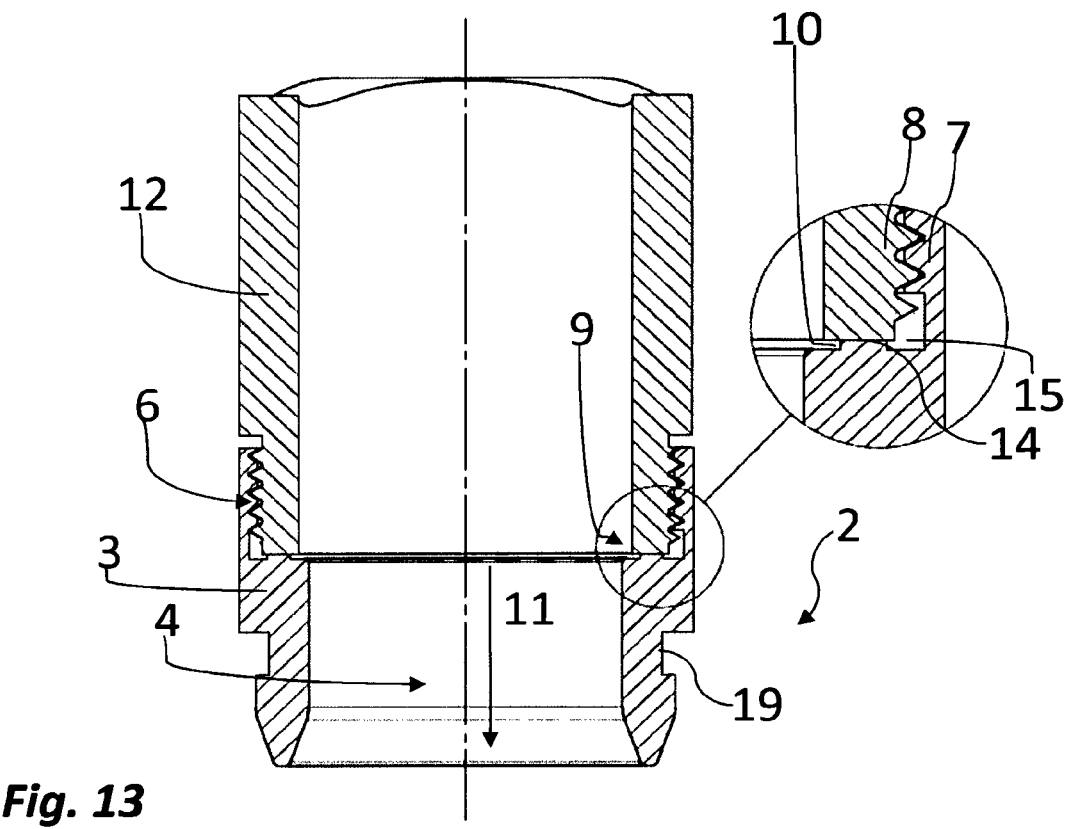
FIG. 13 shows the sanitary outlet device from FIG. 12 in the assembly position illustrated as a longitudinal section, wherein a stop for the fitting outlet screwed into the housing is formed by the protrusion deformed by means of the fitting outlet, said stop sealing off a transition from the housing to the fitting outlet.
Figure 14:
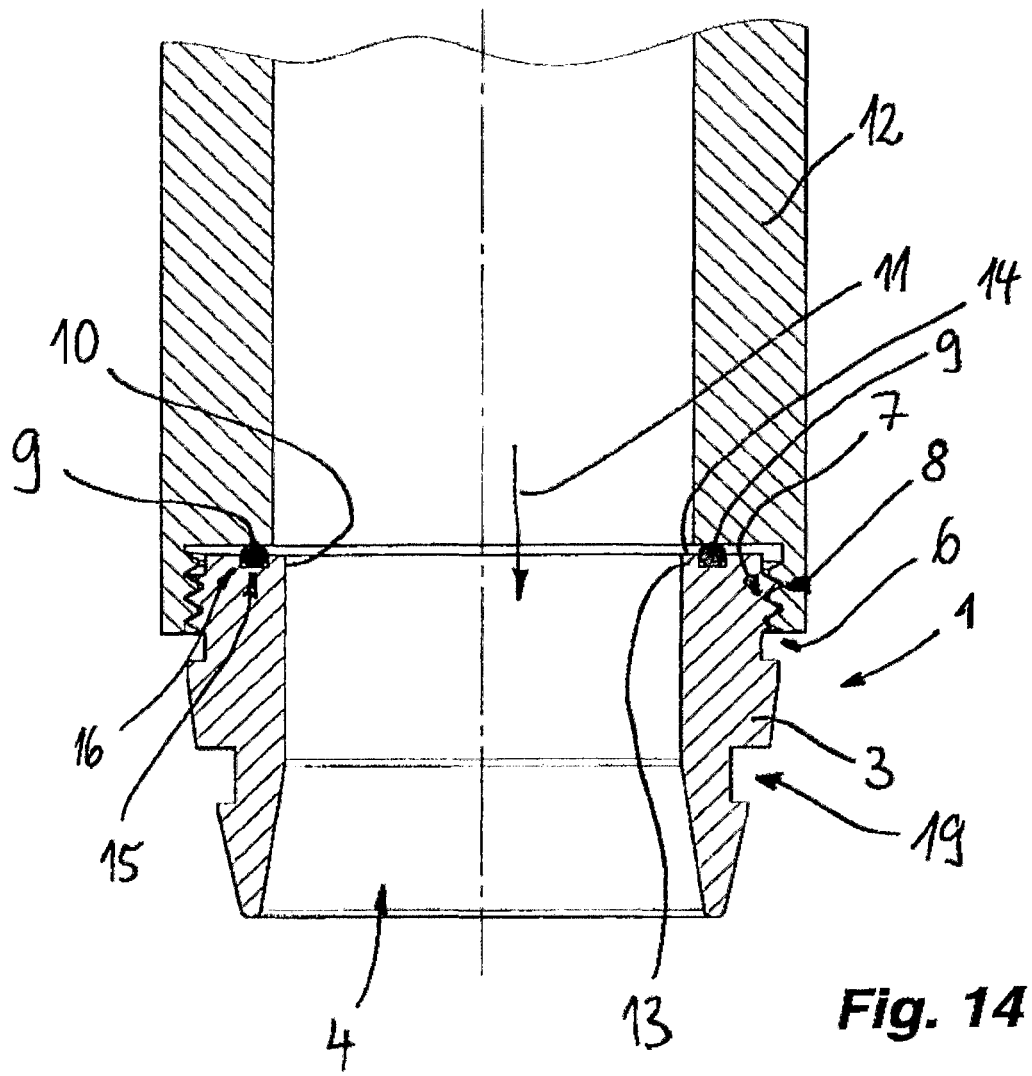
FIG. 14 shows a further sanitary outlet device according to the invention without a jet former, said outlet device having been screwed onto an external thread of a fitting outlet, in a sectional illustration.

FIGS. 12 and 13 illustrate a further embodiment, which is denoted 2 overall. Components and functional units that are functionally and/or structurally similar or identical to the preceding exemplary embodiments are denoted by the same reference signs and not described again separately. The statements made with regard to FIGS. 1 to 11 therefore also apply in a corresponding manner to FIGS. 12 and 13.

The embodiments according to the invention of the sanitary outlet device 1 and 2, as illustrated in FIGS. 1 to 13, each have a housing 3 on which a fitting receptacle 6 having a thread 7 is formed at an inflow-side end. A fitting outlet 12 is or is able to be screwed together with the thread 7 by way of its counterpart thread 8. Formed at an outflow-side end of the thread 7 is a seal 9, by which the flow path 11 is or is able to be sealed off from the outside at a transition from the screwed-in fitting outlet 12 to the housing 3.

In the present exemplary embodiment, the thread 7 is in the form of an internal thread and the counterpart thread 8 in the form of an external thread.

The seal 9 has an encircling protrusion 13 which is formed on the housing 3 in a manner spaced apart from the thread 7 radially toward the inside. The protrusion 13 is designed to protrude in the fitting receptacle 6 counter to the screwing direction 20 defined by the thread 7.

The screwing direction 20 which is defined by the thread 7 corresponds in each case to a flow direction of the flow path 11 in the illustrated configuration of the sanitary outlet device 1 and 2.

The protrusion 13 protruding into the fitting receptacle 6 forms a rubber-free inner face 10 at the transition of the screwed-in fitting outlet 12 to the housing 3. This rubber-free inner face 10 can come into contact with water flowing through the sanitary outlet device 1, 2 in the flow path 11. Since it is rubber-free, it does not tend to be colonized by microorganisms entrained by the water, as is the case for example in conventionally used, exposed rubber parts.

The protrusion 13 delimits, in the fitting receptacle 6, an encircling groove 15 with respect to the flow path 11 of the water flowing through. A groove opening of the groove 15 in this case faces counter to a screwing direction 20 defined by the thread 7.

As illustrated in FIGS. 1, 7, 8, 10 and 11, in the case of the sanitary outlet device 1, a rubber ring 16 has been introduced or is introducible into the encircling groove 15. In the unloaded state, as can be seen in FIGS. 7 and 8, the rubber ring 16 protrudes from the groove 15 counter to the screwing direction 20. In the assembled state of the sanitary outlet device 1 by screwing the thread 7 together with the counterpart thread 8 of the fitting outlet 12, the rubber ring 16 is impinged by an encircling edge of the fitting outlet 12 such that it is pushed into the groove 15 and compressed. The seal 9 thus seals off a transition from the screwed-in fitting outlet 12 to the housing 3 from the outside. In this case, a situation in which water flowing through comes into contact with the rubber ring 16 of the seal 9 is avoided. This has the advantage that no or fewer microorganisms can colonize the gripping rubber, and so the sanitary outlet device 1 according to the invention has better hygiene properties than conventional outlet devices. Therefore, it is particularly advantageous for the rubber ring 16 to be receivable in the groove 15 without sticking out in a compressed state. This also makes it easier to mount the sanitary outlet device 1 on the outlet fitting 12, since the rubber ring 16 received in the groove 15 does not prevent the fitting outlet 12 from bearing directly on the protrusion 13.

The protrusion 13 forms a contact face 14 oriented counter to the screwing direction 20. The contact face 14 forms a stop for a screwed-in fitting outlet 12 which impinges on the contact face 14 of the protrusion 13 in the assembly position, that is to say when the sanitary outlet device 1, 2 is mounted, via its fitting receptacle 6, on the counterpart thread 8 of the fitting outlet 12. Sealing of a transition between the protrusion 13 and a screwed-in fitting outlet 12 is thus already able to be established. By the abovementioned rubber ring 16, even better sealing can be achieved in addition thereto.

Alternatively or in addition, it is conceivable for the edge of the fitting outlet 12 to be able to project at least partially into the groove 15 of the housing 3 in the assembly position of the sanitary outlet device 1.

The rubber ring 16 is configured as an O-ring and has a round cross-sectional profile. It is likewise conceivable for the rubber ring 16 to have some other cross-sectional profile, in particular a rectangular cross-sectional profile.

A width of the groove 15 should, as can be seen in FIGS. 1, 7, 8, 10 and 11, be configured to be wider than the cross section of the rubber ring 16. As a result, a volume that is provided by the groove 15 for receiving the rubber ring 16 is greater than the volume of the rubber ring 16 to be introduced. Thus, in the unloaded state of the rubber ring 16, the rubber ring 16 does not fill the entire groove 15. Thus, free volume is still available in the groove 15, into which the introduced rubber ring 16 is able to be pressed in the impinged state.

The housing 3 is produced from metal at least at the fitting receptacle 6, frequently even in one piece.

The embodiment, illustrated in FIGS. 12 and 13, of the sanitary outlet device 2 has a protrusion 13 that narrows counter to the direction of flow of the flow path 11 and in the present case tapers to a point at its free end. In FIG. 12, the sanitary outlet device 2 has not yet been firmly screwed together, via the thread 7 of its fitting receptacle 6, with the counterpart thread 8 of the fitting outlet 12, such that there is a small gap between the sanitary outlet device 2 and the fitting outlet 12.

The seal 9 of the sanitary outlet device 2 is produced in that the counterpart thread 8 of the fitting outlet 12 is or is able to be screwed fully together with the thread 7 of the fitting receptacle 6 on the housing 3, wherein the thread 7 is in this case configured such that it is possible to screw the fitting outlet 12 beyond an inflow-side end of the protrusion 13. As a result, the protrusion 13, in the configuration of the sanitary outlet device 2 in FIGS. 12 and 13, is deformable by screwing the fitting receptacle 6 together with the fitting outlet 12. The seal 9 of the sanitary outlet device 2 can therefore be configured entirely without rubber parts. The tight bearing of the deformed protrusion 13 on the fitting outlet 12 already affords good sealing of the transition between the housing 3 and the fitting outlet 12. This considerably improves the hygiene properties of the sanitary outlet device 2.

In FIG. 13, the sanitary outlet device 2 is illustrated in the assembly position, wherein the protrusion 13 has been compressed by the fitting outlet 12 and thus forms a stop having a contact face 14 for the fitting outlet 12, with the result that the flow path 11 is sealed off at the transition from the fitting outlet 12 to the housing 3.

The protrusion 13 of the sanitary outlet device 1, 2 can be produced from a deformable material. Preferably, the protrusion 13 is made of a thermoplastic material, in particular POM (polyoxymethylene, also known as polyacetal, polyformaldehyde or acetal). This has the advantage that additional sealants, in particular made of rubber, are unnecessary. Alternatively, the protrusion can also be made of a deformable metal, for example from brass and/or a bronze alloy. The deformability has the advantage overall that the protrusion can bear in a sealing manner on a possibly uneven fitting, without a rubber ring being necessary.

The sanitary outlet device 1, 2 has a widening jet former receptacle 4 that is formed by the housing 3 and into which a jet former 5 is insertable. The jet former 5 is in this case insertable into the housing 3 counter to the direction of flow of the flow path 11 of the water flowing through and is fixable to the housing 3. The jet former 5 can be removed without the housing 3 having to be taken off the fitting outlet 12. The jet former receptacle 4 widens at the outflow-side end of the housing 3 such that it is easier to insert the jet former 5.

FIGS. 5 to 11 illustrate a configuration of the sanitary outlet device 1 which has a jet former 5. The jet former 5 is inserted into the jet former receptacle 4 in a removable manner counter to the direction of flow of the flow path 11. The jet former 5 has a sealing lip 17 which, in the assembled state of the sanitary outlet device 1, bears on an inner wall 21 of the jet former receptacle 4. The sealing lip 17 is in this case arranged at an inflow-side end of the jet former 5. The sealing lip 17 seals the transition from the jet former receptacle 4 of the housing 3 to the jet former 5, in particular to a flow-through duct of the jet former 5. As a result of the configuration of the outlet device 1, 2 according to the invention having a jet former 5 which has a sealing lip 17 made for example of plastic, it is possible to dispense with additional rubber seals 16. Microorganisms can colonize a rubber-free surface, coming into contact with water flowing through, of the sanitary outlet device 1, 2 less well than in the case of conventional sanitary outlet devices which have sealing rubber parts. Thus, the use properties, in particular the hygiene properties, of the outlet devices 1, 2 are improved.

In FIGS. 6 to 8, the jet former 5 is not fixed to the housing 3 but shown in a disassembly position. In order to be fixed to the housing 3, the jet former 5 has at least one only partially encircling and inwardly directed detent 18, preferably several, in particular two, detents 18, which is/are able to be latched to at least one latching cutout 19 on the outer circumference of the housing 3 through a relative rotation of the jet former 5 with respect to the housing 3.

FIGS. 9 to 11 illustrate the sanitary outlet device 1 in the assembly position, wherein the jet former 5 has been latched in the at least one latching cutout 19 on the housing 3 via its at least one detent 18. By way of the detent 18, engaging in the latching cutout 19 in the assembly position, of the jet former 5, the jet former 5 is fixed firmly to the housing 3. The situation according to FIGS. 9 to 11 results from the situation according to FIGS. 6 to 8 in that the jet former 6 is rotated about its axis through an angle of 90°.

FIGS. 14 and 15A-15E show a further embodiment according to the invention of a sanitary outlet device 1. Components and functional units that are functionally and/or structurally similar or identical to the preceding exemplary embodiments are denoted by the same reference signs and not described again separately. The statements made with regard to the preceding exemplary embodiments therefore also apply in a corresponding manner to FIGS. 14 and 15A-15E.

The exemplary embodiment according to FIGS. 14 and 15A-15E differs from the preceding in that the thread 7 is an external thread which is able to be screwed onto an external thread as counterpart thread 8 of a fitting outlet 12. This constellation is met for example in fittings which are used on bathtubs and/or have a larger opening diameter of the fitting outlet 12.

FIGS. 16 and 17 show a further exemplary embodiment according to the invention. Components or functional units that are functionally and/or structurally similar or identical to the preceding exemplary embodiments are denoted by the same reference signs and not described again separately. The statements made with regard to FIGS. 1 to 14 and 15A-15E therefore also apply in a corresponding manner to FIGS. 16 and 17.

The exemplary embodiment according to FIGS. 16 and 17 differs from the preceding exemplary embodiments in that, instead of the lip 21, a sealing ring 22, in this case for example an O-ring, is used. The use of a sealing ring 22 made of rubber is less questionable from a hygiene perspective, since the sealing ring 22 is regularly exchanged together with the jet former 5. To this end, the sealing ring 22 is held on the jet former 5 axially on both sides by in each case one shoulder 23, 24, such that it can be pushed into the jet former receptacle 4 and pulled out of the latter again together with the jet former 5.

LIST OF REFERENCE SIGNS

1 Sanitary outlet device
2 Sanitary outlet device
3 Housing
4 Jet former receptacle
5 Jet former
6 Fitting receptacle
7 Thread
8 Counterpart thread of a fitting outlet
9 Seal
10 Inner face
11 Flow path
12 Fitting outlet
13 Protrusion
14 Contact face
15 Groove
16 Rubber ring
17 Sealing lip
18 Detent
19 Latching cutout
20 Screwing direction
21 Inner wall
22 Sealing ring
23 Shoulder
24 Shoulder

The invention claimed is:

1. A sanitary outlet device (1, 2), comprising a housing (3) having a flow path (11) therethrough, a fitting receptacle (6) at an inflow end of the flow path (11), the fitting receptacle (6) having a thread (7) that is adapted to be screwed together with a counterpart thread (8) of a fitting outlet (12), a seal formed on the inflow side of the housing, the seal (9) is formed such that the flow path (11) is able to be sealed off from outside at a transition from the screwed-in fitting outlet (12) to the housing (3), the seal (9) forms, at the transition, an inner face (10) that is adapted to be wettable by flowing water in the flow path (11), the inner face (10) is formed in a rubber-free manner, the seal (9) has a protrusion (13) that extends in an encircling manner in the fitting receptacle (6) and forms the rubber-free inner face (10) which is rubber-free on a side facing the flow path (11), the protrusion (13) is integrally formed on the housing (3) and is connected thereto in one piece, the protrusion (13) delimits a groove (15), extending in an encircling manner in the fitting receptacle (6), with respect to the flow path (11), the groove (15) is open counter to a screwing direction (20) defined by the thread (7), the protrusion (13) has a contact face oriented counter to the screwing direction (20) and forms a stop for the screwed-in fitting outlet, a rubber ring (16) is located in the groove (15), at least one of the rubber ring (16) protrudes from the groove (15) in an unloaded state, counter to a screwing direction (20), or the groove (15) is formed less deeply than is necessary to fully receive the rubber ring (16), and the groove (15) is dimensioned such that the rubber ring (16) is receivable without sticking out in a compressed state.

2. The sanitary outlet device (1, 2) according to claim 1, wherein the seal (9) includes the protrusion (13) that extends in an encircling manner in the fitting receptacle (6) and forms the rubber-free inner face (10) on a side facing the flow path (11), the protrusion (13) is integrally formed on the housing (3) and is connected thereto in one piece, and the protrusion (13) is made of a deformable material.

3. The sanitary outlet device (1, 2) as claimed in claim 1, wherein the seal (9) has the protrusion (13) that extends in the encircling manner in the fitting receptacle (6) and protrudes into the fitting receptacle (6) counter to the screwing direction (20), defined by the thread (7), on the housing (3).

4. The sanitary outlet device (1, 2) as claimed in claim 1, wherein the protrusion (13) that extends in the encircling manner in the fitting receptacle (6) is formed radially within the thread (7) or radially at a distance from the thread (7).

5. The sanitary outlet device (1, 2) as claimed in one claim 1, wherein the protrusion (13) is made of plastic.

6. The sanitary outlet device (1, 2) as claimed in claim 1, wherein the protrusion (13) has a cross-sectional profile that narrows counter to the screwing direction (20) defined by the thread (7).

7. The sanitary outlet device (1, 2) as claimed in claim 1, wherein the thread (7) allows the fitting outlet (12) to be screwed beyond an inflow-side end of the protrusion (13).

8. The sanitary outlet device (1, 2) as claimed in claim 1, wherein the rubber ring (16) has a nonround cross-sectional profile.

9. The sanitary outlet device (1, 2) as claimed in claim 1, wherein a volume of the groove (15) is greater than a volume of the rubber ring (16).

10. The sanitary outlet device (1, 2) as claimed in claim 1, wherein the housing (3) is made of metal at least at the fitting receptacle (6).

11. The sanitary outlet device (1, 2) as claimed in claim 1, wherein the housing (3) transitions, on an outflow side with respect to the rubber-free inner face (10), into a widening jet former receptacle (4), into which a jet former (5) is inserted in a removable manner.

12. The sanitary outlet device (1, 2) as claimed in claim 11, wherein the jet former (5) is deformed, in the inserted state, at least at an inflow-side end thereof, by the jet former receptacle (4).

13. The sanitary outlet device (1, 2) as claimed in claim 11, wherein the jet former (5) is made of plastic.

14. The sanitary outlet device (1, 2) as claimed in claim 11, the jet former (5) has, at an inflow-side end thereof, a sealing lip (17) that bears on the jet former receptacle (4) or a sealing ring (22) that bears on the jet former receptacle (4), or both.

* * * * *